July 4, 1939.  H. T. BACKHOUSE  2,164,794
LUBRICATOR
Filed May 21, 1936
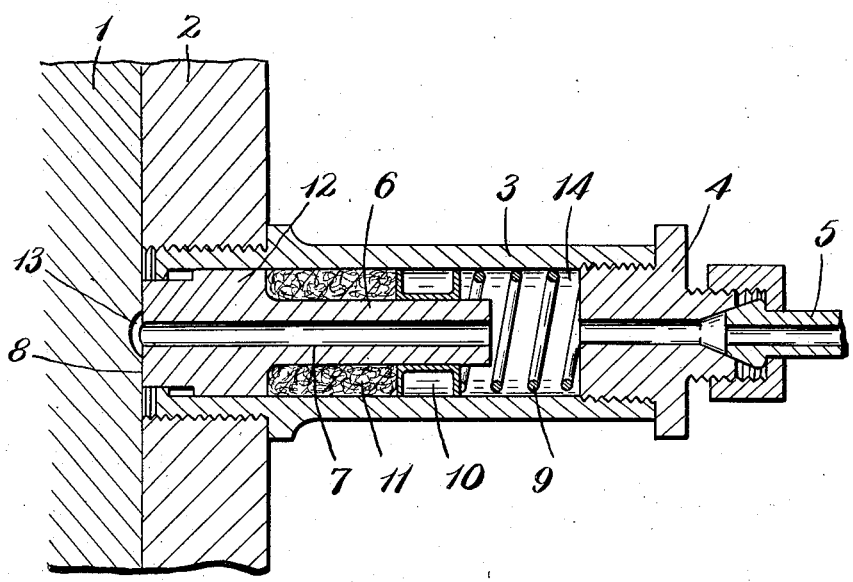
INVENTOR.
HEADLEY TOWNSEND BACKHOUSE
BY Kwis Hudson & Kent
ATTORNEYS

# UNITED STATES PATENT OFFICE 2,164,794

LUBRICATOR

Headley Townsend Backhouse, London, England

Application May 21, 1936, Serial No. 80,980
In Great Britain December 6, 1935

4 Claims. (Cl. 184—6)

This invention consists in improvements in or relating to lubricators and has for an object to provide a lubricator for applying oil to a moving part of a mechanism only so long as that part is moving and for substantially preventing the flow of oil when the part is at rest.

With this object in view the invention provides a lubricator comprising in combination an oil conduit having its end movable into contact with the moving part, means for maintaining pressure contact between the conduit end and the moving part and means for supplying oil under low pressure to the conduit, the end of the conduit being shaped and arranged to cooperate with the moving part to effect a substantially oil-tight closure of the conduit when the part is at rest and to allow oil to be drawn off by the part, when it is in motion, through the conduit.

In one form of the invention the lubricator provides in combination a tubular guide member, a plunger axially slidable in the guide member into a position in which its end is in contact with the moving part, the plunger having a longitudinal oil conduit leading to the said end and the end being so shaped and arranged as to cooperate with the moving part to effect a substantially oil-tight closure of the conduit when the moving part is at rest and to allow oil to be drawn off through the conduit by the part when it is in motion, spring means for applying axial pressure to the plunger to maintain the end referred to in pressure contact with the moving part to effect the closure and means for supplying oil under low pressure to the plunger conduit. Preferably the guide member and the plunger together form an oil-tight chamber having an oil inlet through the walls of the guide member and an outlet through the plunger conduit and packing is provided for maintaining the seal betwen the plunger and the walls of the guide member.

The invention includes the combination with a mechanism having a moving part, of a lubricator of the kind described above arranged to cooperate with the moving part as aforesaid, characterized in that the moving part has a recess (or recesses) arranged to move into communication with the conduit but of such dimensions as not to by-pass the seal.

One specific embodiment of the invention will now be described by way of example with reference to the accompanying drawing which is a section through the plunger, guide member and associated parts.

In this embodiment the moving part 1 is the flat end of the rotor of an air pump of the rotary, radially moving vane type, the pump being used for supplying air under pressure to a sheet-feeding machine. Screwed into the stationary end cover 2 of the pump is a tubular guide member 3 having a plug 4 in one end through which oil may be supplied by the pipe 5. Located in the other end of the guide member is a longitudinally movable plunger 6 having an axial hole 7. The end 8 of the plunger is, in this case, flat and when pressed into contact with the rotor end forms a substantially oil-tight joint therewith. The plunger is pressed into contact with the rotor end by a spring 9 bearing against the plug 4 and the floating collar 10, which transmits the pressure through oil-tight packing 11 to a shoulder 12 formed on the plunger. Recesses 13 are formed in the rotor end at locations such that as the rotor rotates they will move in turn into communication with the end of the hole 7. These recesses have a diameter which is so limited that the recess cannot extend from the edge of the hole 7 to the outer wall of the plunger in any direction. A gravity tank (not shown) for supplying oil through the pipe 5 under a low pressure is provided.

In the operation of the device oil is supplied from the gravity tank to the cavity 14 in the guide member and so long as the rotor is in movement it will "wipe-off" oil from the end of the hole 7. When the air pump is stopped the rotor forms a closure for the end of the hole 7 and further flow of oil is prevented.

In some circumstances it may be found that the cavities 14 may be omitted and that sufficient oil will be "wiped-off" from the end of the plunger by the moving part. Again in some circumstances it may be found desirable to provide more than one outlet hole for the oil in the plunger end.

The moving part may have a flat bearing surface such as the rotor end previously described or a cross-head, or it may have a curved surface such as that of a journal, piston, piston rod or sleeve or it may be of any other shape provided that it always remains in contact with the end of the plunger. The plunger end must, in each case, be shaped closely to fit the moving part.

It is an advantage of the arrangement described that not only is the oil supply shut off when the moving part is at rest but also the amount of oil supplied is automatically varied in accordance with the speed of movement of the moving part.

Having thus described my invention, I claim:

1. A lubricator for applying oil to a moving part of a mechanism only so long as that part is moving and for substantially preventing the flow of oil when the part is at rest, comprising in combination an oil conduit having its end movable into contact with the moving part, means for maintaining pressure contact between the conduit end and the moving part and means for supplying oil to the conduit, the end of the conduit being shaped and arranged to cooperate with the moving part to effect a substantially oil-tight closure of the conduit when the part is at rest and to allow oil to be drawn off from the conduit by the part, when the latter is in motion, said moving part having a surface recess therein arranged to intermittently connect with said conduit and receive oil therefrom.

2. In combination, a machine frame, a moving part mounted therein having a recess in an outer face thereof, a lubricator guide member mounted in said frame facing said moving part in position to register periodically with said recess, a plunger mounted in the guide member, the forward end of the plunger being formed and finished to make close contact with the said moving part, the guide member and the plunger together forming an oil-tight chamber having an oil inlet through the guide member and an outlet through the plunger to the forward end thereof, the said recess in the moving part and the forward end surface of the plunger being of such size relatively that the recess will be entirely bridged as it moves past the plunger.

3. In apparatus of the class described, an oil conduit, a member movable in relation thereto, an end of said conduit contacting with the movable member and so formed as to constitute a seal substantially preventing the flow of oil when the member is stationary, said member having a recess arranged to intermittently connect with the said conduit and receive oil therefrom as the member moves, said recess and conduit being of such relative proportions that the seal is not by-passed by the recess in any position of the movable member.

4. In apparatus of the class described, an oil conduit, a member movable in relation thereto, an end of said conduit contacting with the movable member and so formed as to constitute a seal substantially preventing the flow of oil when the member is stationary, said member having a surface recess arranged to intermittently connect with the said conduit and receive oil therefrom as the member moves, whereby a measured charge of oil is taken by said member for each cycle of movement thereof.

HEADLEY TOWNSEND BACKHOUSE.